April 8, 1930.  A. HEYLAND  1,754,017
POLYPHASE COMMUTATOR DYNAMO ELECTRIC MACHINE
Filed March 27, 1925   3 Sheets-Sheet 1
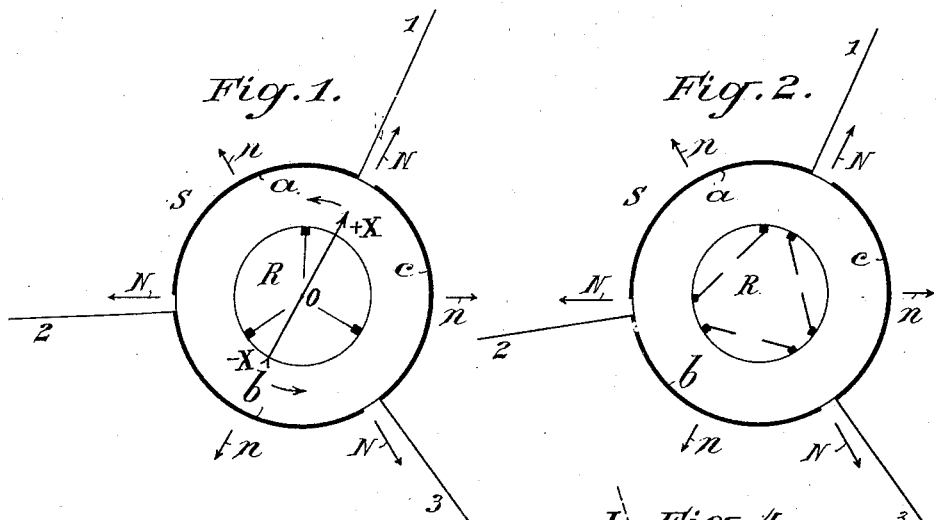
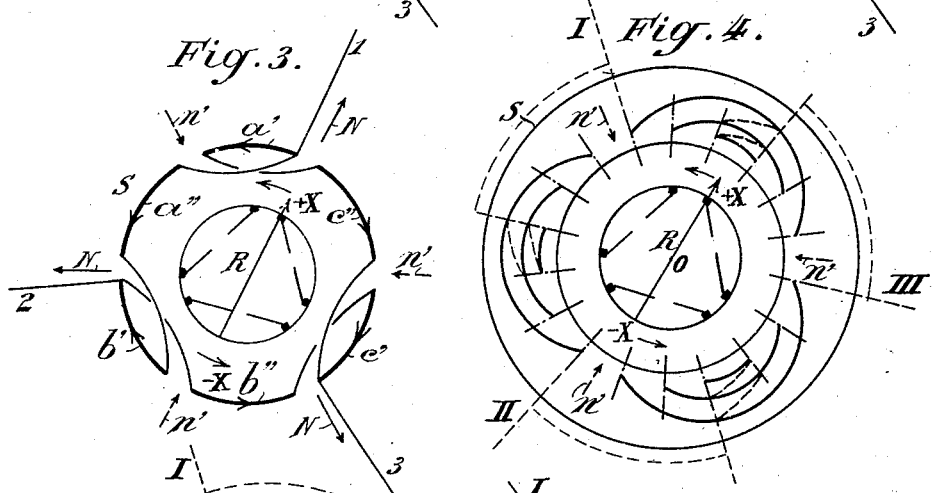
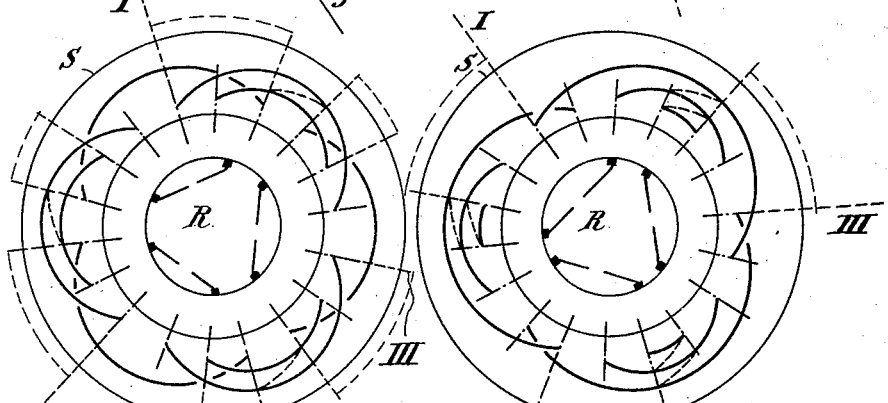
Inventor
Alexandre Heyland

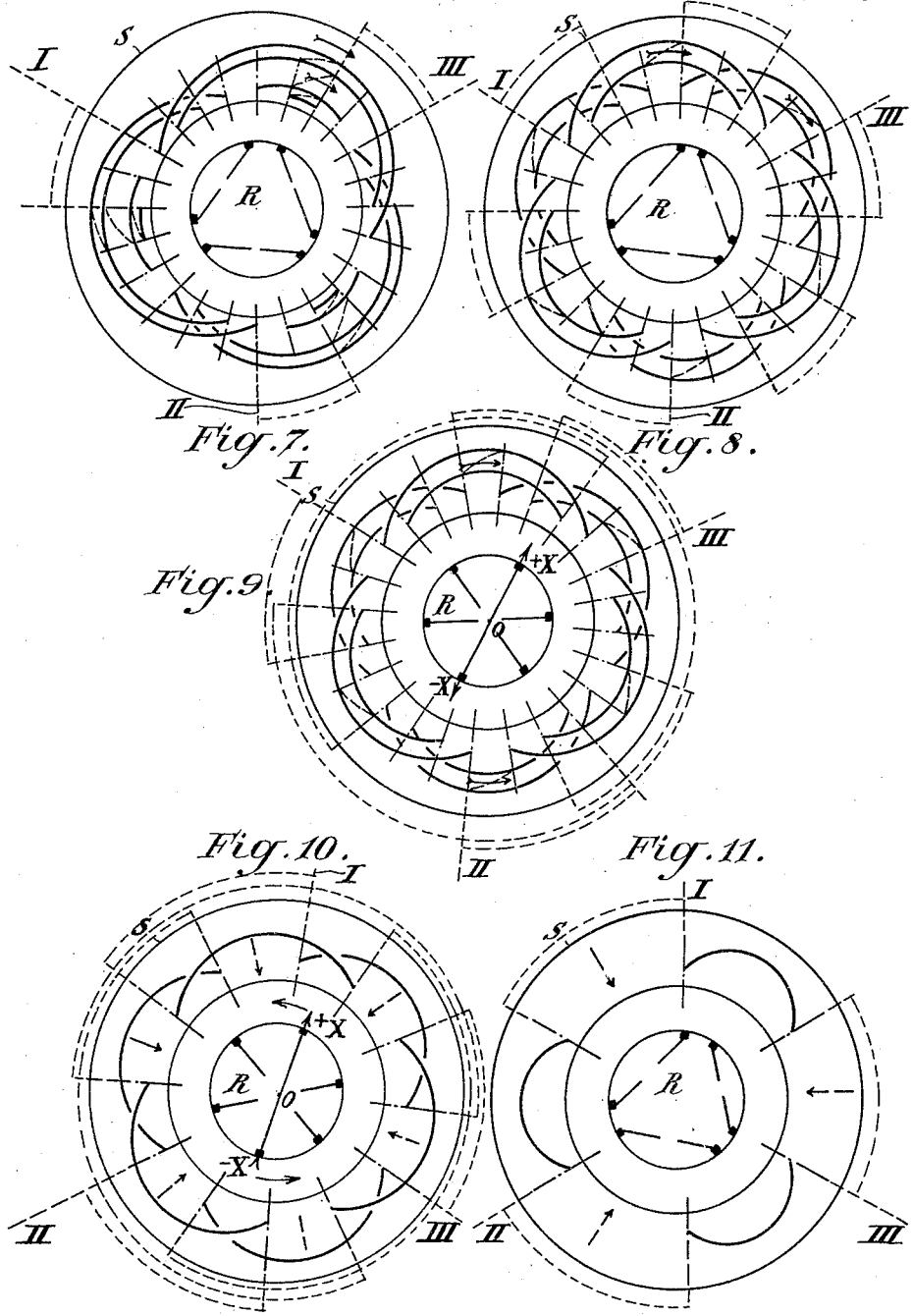

April 8, 1930.  A. HEYLAND  1,754,017
POLYPHASE COMMUTATOR DYNAMO ELECTRIC MACHINE
Filed March 27, 1925   3 Sheets-Sheet 3
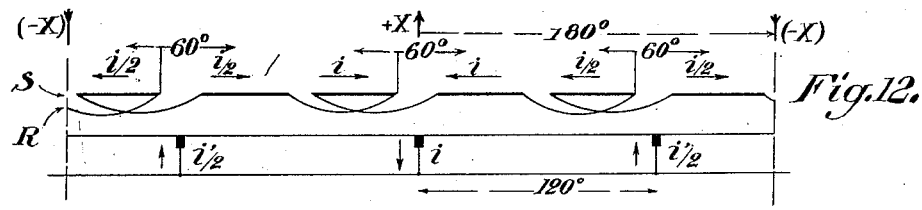
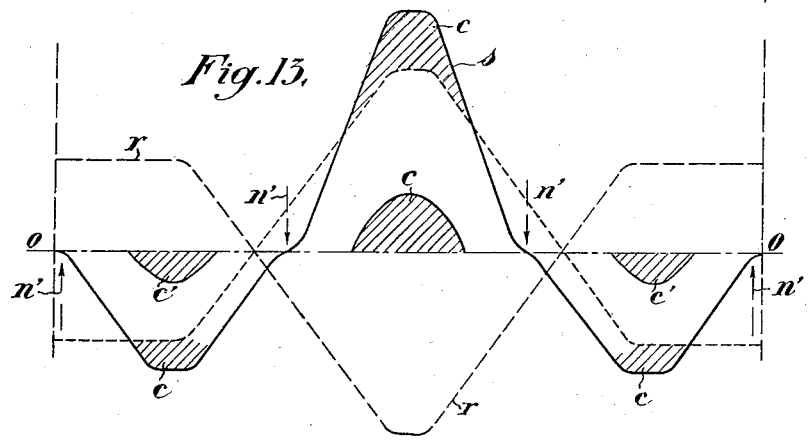
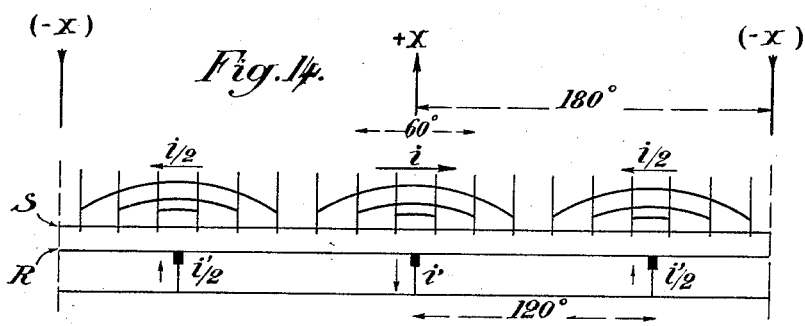
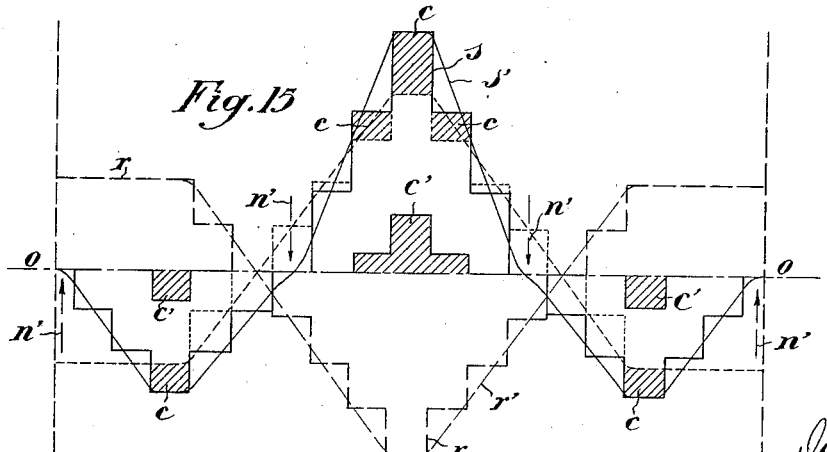

Patented Apr. 8, 1930

1,754,017

UNITED STATES PATENT OFFICE

ALEXANDRE HEYLAND, OF BRUSSELS, BELGIUM

POLYPHASE COMMUTATOR DYNAMO-ELECTRIC MACHINE

Application filed March 27, 1925, Serial No. 18,922, and in the Netherlands May 12, 1924.

The present invention consists of a particular arrangement of stator winding for polyphase commutator machines. Its object is to attain good commutation in such machines in general.

The invention relates especially to improvements in polyphase commutator motors with rotating fields, and besides effecting greatly improved commutation, it also secures greatly increased power factors in such motors, as will be further explained.

The accompanying diagrams serve in explaining the invention.

Figures 1 and 2 show diagrammatically the distribution of ampere-turns in known arrangements.

Figure 3 shows diagrammatically the essential difference in the distribution of ampere-turns according to the present invention, and Figures 4 to 11 show several modifications of the invention.

Figure 12 is a diagram showing the arrangement of Figure 3 set out on a straight line and the momentary distribution of the current of the stator and rotor, the brushes being in the short circuit position.

Figure 13 is a diagram in which the curve $s$ shows the resultant distribution of ampere turns of the stator. From this diagram it appears at once that at the regions marked $n'$ between the phase axes, these ampere turns become relatively weaker. The curve $r$ of the ampere turns of the rotor remains the same and normal. Assuming that the total ampere turns are approximately the same in the stator and rotor, it is evident that the ampere turns of the stator will become raised in the direction of the phase axes, as shown by the hatched parts $c$. Their differences produce in consequence additional fields which form commutating field $c'$, $c'$, $c'$, $c'$, at the phase axes.

Figures 14 and 15 are diagrams showing the analogous relations with a stator winding according to Figure 4 in which the distribution of currents is in principle the same as in the arrangement of Figure 3.

All the figures show bipolar arrangements. In Figures 1 to 3 the stator winding is assumed to be a simple ring winding closed upon itself. The changes necessary for an open circuit winding, or for multipolar arrangements are obvious.

All the figures except Figures 9 and 10 deal with the simplest case of a three-phase motor with a winding having three axes, that is to say a strictly three-phase winding, the diagrammatic representation of the current distribution applying to a ring winding on the stator and the rotor. In this case the three-phase current is led to the stator at three points I—II—III separated by 120° (Figures 4 to 11). In practice this corresponds to a drum winding with a chord pitch of about two-thirds the polar arc, the currents in which are represented in the same diagram.

That is to say the distribution of the current in an annular field, to which the current is conducted at two points spaced 180° corresponds to the distribution of the currents in a drum winding having a diametrical pitch or polar pitch. The distribution of the current in a ring winding to which the current is conducted at three points spaced 120° corresponds to the distribution in a drum winding with two-thirds of the polar pitch.

The changes necessary for other connections of the winding are obvious. The phase difference of the resultant currents in two parts of a winding of given phase number situated on opposite sides of an axis of the winding is, for a normal connection, always equal to the angle between the phases, that is in the three-phase winding here chosen $360/3 = 120°$, in a two-phase motor with a winding having four axes, that is a four-phase winding, $360/4 = 90°$, and in a three-phase motor with a winding having six axes, that is a six-phase winding, $360/6 = 60°$.

Figures 9 and 10 relate to a three-phase motor with a winding having six axes, that is to say, they correspond to a ring winding to which three-phase current is led at 6 points at 60°. In practice this corresponds to a drum winding with a normal winding pitch diametral to the rotor.

In the running position the brushes are ordinarily so placed that the resultant phases of the ampere-turns of the rotor are approximately opposed to those of the stator.

In Figure 1, for a winding having three axes therefore, the exterior circle S represents the stator winding, supposed to be a simple ring winding with three terminals 1, 2 and 3. The interior circle R represents the rotor or its commutator with three brushes, indicated here on the interior, that is one brush per phase, the brush circuits being at first open.

These brush circuits and those hereinafter referred to are not shown, as it is not necessary. The brushes may effectively be short circuited for example, in case the motor is one in which the rotor turns in a short circuit.

Figure 2 does not differ from Figure 1 except in the brush circuits and in the provision, also known, of a pair of brushes per phase. These brushes may both be fixed, or the following brush can be fixed, for instance in the phase axis, while the other is adjustable, or both brushes may be adjustable.

The connection of the stator winding in both Figures 1 and 2 is the same ordinary winding with three axes. For greater clearness the three phases of the stator resulting from the terminals 1, 2 and 3 are indicated by three portions $a$, $b$ and $c$ of the circumference in thickened lines.

The brush circuits being first open, the stator ampere-turns alone would produce fields along the phase axes, the magnitude and phase of which are represented by the arrows N, N, N and between them fields represented by the arrows $n$, $n$, $n$, the magnitude and phase of which are the resultants of the fields N, N, situated on each side.

The ratio $n/N$ for the winding with three axes chosen is approximately $½$; for a winding with four axes it is $\frac{\sqrt{2}}{2}$ and for a winding with six axes $\frac{\sqrt{3}}{2}$.

The ampere-turns produced by the brush circuits of the rotor alone are substantially opposed to those of the stator and give a similar distribution corresponding to the position of the brushes, with three maxima in the axes of the brushes which correspond to the arrows N, N, N, and, in the intervals between those fields which correspond to the components $n$, $n$, $n$, but which, everywhere, are substantially opposite in direction and phase, to those of the stator.

In the so-called short circuit position of the brushes, the ampere-turns of the rotor are exactly opposed to those of the stator at all points of the circumference and, except for stray fields are annulled by them. In Figure 1 of the drawings the axes of the brushes on the rotor are represented as having been slightly shifted with respect to the axes of the stator. The resultant ampere-turns produce the useful cross field of the motor.

The lag of the current is therefore determined in the main by the resultant ampere-turns necessary for magnetizing the stator.

The known means, for example in series motors, for obtaining higher power factors, that is, for obtaining a smaller lag, or an actual lead of current, consists for this reason in making the ampere-turns of the rotor slightly larger than those of the stator. This is obtained in such cases by connecting the stator and the rotor in series and by suitable choice of the numbers of turns, or of the ratio of transformation of the transformer between them.

The said means, however, have several inconveniences, among others that of causing less satisfactory commutation in such motors.

The novelty is primarily a method which produces in polyphase commutator machines, commutating fields without it being necessary for providing such machines with commutating poles. The method produces at the same time a decrease in the lag of current behind voltage in such motors.

The novelty consists in such a disposition of stator windings that the mean pitch of the stator is less than the winding pitch of the rotor. It produces the said effects by the resultant and different distribution of ampere turns on the stator and rotor, or in other words by the differential form of the curve of ampere turns of the main winding of the stator.

The known machines always have on the stator a winding, main or compensating, having the same winding pitch as that of the rotor and producing the same form of ampere turns curve as the rotor, but inverted.

The representation in Figure 1 by vectors N, N, N and $n$, $n$, $n$ for a normal three axial connection for example, serves to give a constant image for the distribution of ampere turns.

The momentary distribution of ampere turns which can be shown in the form of a curve, corresponds to the projections of these vectors on a straight line $+xo-x$ which rotates about the point $o$ in synchronism with the periodicity of current.

This line $+xo-x$ is shown for example in the accompanying drawing, in the three axial arrangements of Figures 1, 3, 4 and in the 6 axial arrangements of Figures 9 and 10 at the moment when it passes through one of the phase axes of the stator.

In Figure 4, the rotor winding pitch is 120°, that is the normal pitch for a three axial arrangement. On the stator the mean pitch is 60°, that is 0.5 of the normal pitch. This figure indicates the position of the coils.

The connections are indicated by dotted lines.

In the three axial arrangements of Figures 5, 7, 6 and 8, the momentary values are produced in an analogous manner, with the sole difference that the mean pitch of the stator coils is less reduced and in consequence the resultant commutating fields are relatively weaker.

The desired new effect is obtained throughout by the fact that the mean pitch of the stator is less than that of the rotor.

The consequence is that in the first place the ampere turns of the stator become relatively smaller in a direction transverse to the phase axes. The ampere turns of the rotor form in this direction a component, which in motors produces the effect on the lag of current mentioned in the specification.

In a series motor, these E. M. F.'s which correspond to the phases of the ampere-turns of the rotor combine with the E. M. F.'s induced in the stator so as to produce a diminution of the phase lag or a lead, of current relative to the E. M. F.

In a shunt motor, they produce an increase in the rotor current of such phase that the effect is similar to that above stated. In a motor of which the brushes are closed through a low tension circuit, or short circuited, they produce also a similar effect.

In this case particularly the increase of current produces further increase of the said components and a certain self-excitation of the rotor, so that even with relatively low speeds, increased E. M. F. is obtained.

Satisfactory commutation results from the particular arrangement of the stator windings and from the resulting distribution of the stator current as will be explained further on.

With ordinary windings and connections, as shown in Figures 1 and 2, the ampere-turns of the rotor could not produce the additional field components as explained above, since these ampere-turns are equal and everywhere annulled by the rotor ampere-turns of opposite direction.

In all the applications of the new principle it is necessary therefore, to wind the stator in such a manner that the resultant ampere-turns in suitable spaces between the phase axes do not correspond, as they do at $n$, $n$, $n$ in Figures 1 and 2, to the components of the ampere-turns in the phase axes situated on each side, but are smaller than they.

Figure 3 shows diagrammatically the difference in principle between the new distribution of stator ampere-turns and the ordinary distribution according to Figures 1 and 2. This difference consists in distributing the different phases over the circumference in such a manner that at points between the phase axes, ampere-turns are superposed upon the total distribution of the current, which are opposed to the resultant of the ampere-turns in the phase axes on each side.

In Figure 3 for example, for the winding with three axes chosen, the rotor connections remaining the same, the stator winding assumed, as in Figures 1 and 2, to be a simple ring winding, is divided into two parts per phase, $a'$ and $a''$, $b'$ and $b''$, $c'$ and $c''$ and in all cases two parts situated on opposite sides of a phase axis $a'$ and $c''$, $b'$ and $a''$, and $c'$ and $b''$ are connected reversely. In this way, the phase difference of the resultant currents in each group of two parts on opposite sides of a phase axis becomes greater, 180° instead of 120°, while in the spaces between two phase axes, they become negative, in this case $-60°$.

The result is that in these spaces opposed ampere-turns $n'$, $n'$, $n'$, are superposed on the components $n$, $n$, $n$, resulting from the ampere-turns N, N due to the stator current in the phase axes on each side. In this way the total ampere-turns diminishes at these points and is equal to the difference $n-n'$.

In practice this arrangement offers the advantage of being particularly simple, as the oppositely connected parts of the diagrams can be directly wound helically in series.

Figure 4 shows such a construction. S is again the stator, with, for example, 18 slots indicated by radial dividing lines, in which the winding portions $a'$ and $c''$, $b'$ and $a''$, $c'$ and $a''$ are combined in three coils placed side by side.

The ampere-turns superposed between the phase axes are also shown in this figure by means of dotted arrows $n'$, $n'$, $n'$, and act like consequent poles in the field of the coils, produced by the difference in phase of the currents in the neighboring windings.

In the ordinary arrangement of a 3-axial winding, the pitch of the stator winding as that of the rotor winding, is two-thirds of the polar pitch for 18 slots per pair of poles therefore, it will correspond to a drum winding with a winding pitch of six slots.

In Figure 4 the mean stator winding pitch, per phase, the mean of 1, 3, 5, is three slots, and is therefore equal to 0.5 of the ordinary pitch.

In certain cases the method of construction described with reference to Figure 4 gives too powerful an effect. In such cases the ampere-turns of the stator transverse to the phase axes can be less reduced. This is effected most simply by reducing the parts of the winding which produce the superposed and opposed ampere-turns, or by winding in a slightly different manner.

For example, the interior and exterior turns of the coils can be wound differently.

Figure 5 shows for example the same scheme as Figure 4, in which the interior turns of each winding are replaced by transversely placed turns. The three phases of these second coils can be connected in various ways with the short coils.

In Figure 5 the mean stator winding pitch is, per phase, the mean of 3, 5, 5 equal to 4.33 slots, and is equal therefore to 0.72 of the ordinary winding pitch.

Figure 6 also shows the same scheme as Figure 4 in which the exterior turns are superposed on, cover, overlap, or cross those of the neighboring coils. These turns can be placed as indicated in neighboring slots, or in the same slots, so that the currents of the two phases are superposed in these places to give resulting currents of mean phase.

In Figure 6 the mean stator winding pitch, per phase, the mean of 1, 3, 7, is equal to 3.66 slots, and is equal therefore to 0.61 of the ordinary winding pitch.

Figure 7 shows a scheme similar to that of Figure 6 with a stator having 24 slots indicated by radial dividing lines, the pitches being such that per coil and per phase, the turns in two pairs of slots are wound so that they do not cross, and the turns in two other pairs of slots so that they do cross.

In the ordinary arrangement of a 3-axial winding, the winding pitch of the stator as of the rotor would be two-thirds of the polar pitch, and so for 24 slots per pair of poles would therefore correspond to a drum winding having a stator pitch of eight slots.

In Figure 7 the mean stator winding pitch, per phase, is the mean of 1, 3, 9, 11, equal to 6 slots, therefore equal to 0.75 of the ordinary winding pitch.

In this case to avoid the long exterior turns, the connections could equally well be such that the halves of the short coils and those of the long coils are interchanged.

The resulting current distribution remains the same.

Figure 8 shows this arrangement. The winding corresponds in a bipolar scheme, to a normal diametral four-pole winding, but connected for two poles and 3-axial. For the 3-axial connection here chosen, two successive coils are always connected in the same direction in series, as indicated for one phase by the two arrows. The current distribution is therefore the same as for Figure 7.

In Figure 8 the mean stator winding pitch per phase, the mean of 5, 7, 5, 7, is equal to 6 slots, once more therefore 0.75 of the ordinary pitch.

Figure 9 illustrates an application of the principle to a motor with 6-axial winding, that is, a six-phase winding. In the bipolar arrangement, the stator winding pitch corresponds, in this case for example, to that of an ordinary diametral 4-pole winding, connected in known manner for two poles and 6-axial, so that two diametrally opposite coils are joined in a single phase, as indicated by the two arrows in Figure 9. The rotor winding is in this case an ordinary diametral two-pole winding.

In the ordinary arrangement of a 6-axial winding, the winding pitch of the stator as of the rotor is equal to the polar division, for 24 slots per pair of poles therefore, it will correspond to a drum winding having a stator winding pitch of 12 slot divisions.

In Figure 9 the mean stator winding pitch is the mean of 5, 7, 5, 7, per phase, equal to 6-slot divisions, equal therefore to 0.5 of the ordinary winding pitch.

The arrangement according to the present invention leads in practice, therefore, to the mean stator pitch being less than that of the rotor, and less than the ordinary winding pitch of the connection.

The result is obtained throughout that the different stator phases are coupled in such a manner that they produce, not a current distribution similar to that produced in the rotor by the brush circuits as in ordinary rotating field motors, but a substantially different distribution. In ordinary induction motors, for example, the effect would be termed, according to usual custom, a dispersion effect and would produce disadvantageous dispersion fields. In these commutator motors, on the contrary, this arrangement produces the usual effect described.

In certain cases, it may be useful, to obtain an increased effect, to increase still more this dispersion effect between the stator and rotor, for instance by winding the different phases in a single slot per phase, as shown in Figure 10 for 6-axial connection and in Figure 11 for 3-axial connection. The dispersion effect in the teeth between the different phases, indicated again by dotted arrows, occurs still more strongly.

The invention resides essentially in the conception of the useful effect of these additional field components (which in the ordinary way would be considered as a disadvantageous dispersion effect for all ordinary induction motors), as well in its beneficial effect on the power factor as, and especially, in its effect in general on commutator machines, in giving satisfactory commutation, as explained above.

This effect mentioned above of achieving such satisfactory commutation is based on the fact that the said additional field components produce in the brush zones a field of the phase of a commutation field.

The brushes are generally placed in positions where the ampere-turns of the stator, which lag with respect to the brush positions in the direction of rotation, have a phase lag relatively greater than for ordinary connections of the different phases of the stator. These ampere-turns induce approximately opposite currents under the brushes, and these currents therefore also lag behind the rotor currents and are superposed on the brush currents. The result in essence is that the resultant total currents under the brushes are concentrated towards the front edges of the brushes, and are reduced at the rear edges of the brushes where interruption occurs.

The invention can also be used with greater advantage for machines in which, for example, a high power factor is not desired. In all such cases, the arrangement forming the object of the invention, permits, as for direct current machines, the rotor to be wound with a greater number of turns between the segments and a corresponding reduction in the dimensions of the commutator.

The known arrangements for achieving good commutation in machines with stationary fields such as direct current machines, namely compensating windings and commutating poles on the stator, have not found practical application to the case of rotating field motors.

Compensating windings, which are connected in series with the rotor, are wound in such a way that they produce a current distribution in the stator almost identical with that in the rotor but of opposite phase, thus corresponding to the arrangement in Figure 1 for example. Further, the ratio of the turns for the purpose of effecting good commutation, is made such that the number of ampere-turns on the stator is greater than on the rotor. This greater number of stator ampere-turns would have precisely the opposite effect on the power factor to the present arrangement, and would give a lower power factor so that it would be disadvantageous rather than advantageous for rotating field motors.

Commutating poles which also have to be connected in series with the rotor brushes, and in machines with stationary fields, fill with their windings the free space between the poles, have not met with practical application to rotating field motors because it has been found that the spaces between the poles are insufficient to contain them. In order to obtain space on the circumference for the main field, it has been proposed to provide commutating poles for only half of the commutation zones, none being provided for the other half. In spite of this, for usual frequencies and the small polar divisions, the commutating poles have to be so narrow that owing to various inconveniences they have not found practical application.

The connections according to the invention, from the point of view of their effect on commutation, bear a certain resemblance to commutating poles. They avoid, however, the inconveniences of the latter since they do not intercalate a commutating field into the main field at points where space is particularly limited, but superpose on the complete main field a field component of multipolar form in the bipole arrangement, that is of the form of a harmonic field the phase of which in the spaces between the phase axes produces the effect already explained above on the power factor, and the phase of which at the phase axes corresponds to the phase of a commutating field.

This is particularly clear in the modes of construction indicated where instead of making the winding pitch of all the coils less than the ordinary pitch of winding for the connection chosen, the mean pitch of the winding is made less by using separate longer and shorter coils for each phase, as for example in Figure 7.

In Figure 7 with a 3-axial coupling and 24 slots in the stator the ordinary pitch is 8 slots. The pitch of winding of the four coils, per phase, here are 1, 3, 9, 11, their mean pitch therefore being 6 which is 0.75 of the ordinary pitch.

The current distribution is the same as in Figure 8 with equal coils. The coils belonging to one phase indicated by the arrows here have pitches 5, 7, 5, 7, the mean pitch again being 6.

In Figure 7 the teeth within the short coils act on the brushes placed in these regions similarly to commutating poles. If the number of slots were reduced by half so that the two short coils per phase became united in a single short coil, the resemblance would be still greater. The effect would be similar for Figure 8, where two adjacent coils per phase are superposed to produce the same current distribution.

For arrangement with only a single brush per phase, the commutating field acts on all the brushes, as shown in Figure 9 for example.

In Figure 9, with a 6-axial connection and 24 slots in the stator, the ordinary diametral pitch is 12. The winding pitch here is 5, 7, 5, 7, the mean winding pitch being therefore 6 which is 0.5 of the normal diametral pitch.

If this winding is arranged in the form of separate long and short coils, there will be per phase with two diametral brushes, concentric short and long coils. The same current distribution is obtained, for example, with eight coils per phase, would two per slot, of which the pitches are 1, 3, 9, 11, 11, 9, 3, 1, that is with a mean pitch again of 6, or with four coils per phase, would one per slot, the pitches of which will be 1, 11, 11, 1, that is with a mean of 6.

In these cases, the small coils, with a pitch of 1, enclose a single tooth. In the three phases the short coils are at the six points where the brushes are situated in Figure 9 and the external resemblance to commutation poles is here very great.

The essential external difference from the usual arrangement of commutating poles is, however, that the ampere-turns of the short coils here cover half the total circumference.

On the other hand in order to obtain space on the circumference for the main field, only a small fraction can be allowed for the usual commutating poles, and particularly so for those proposed hitherto for rotating field motors.

In the above description reference has been chiefly made to motors, but as already stated the arrangement relates as well to all other machines (for example to generators) with stator and rotors.

What I claim is:—

A nonsalient pole commutator machine having a winding for the stator, the mean resultant winding pitch of which is less than that of the winding for the rotor, the ampere turns of the stator between the phase axes being less than the resultant of the rotor ampere turns between the phase axes, so that between the phase axes the rotor field is greater than the stator field and nonsalient commutating fields are produced.

In witness whereof I affix my signature.

ALEXANDRE HEYLAND.